US010986592B2

(12) United States Patent
Chang et al.

(10) Patent No.: US 10,986,592 B2
(45) Date of Patent: Apr. 20, 2021

(54) METHOD RELATED TO POWER HEADROOM REPORT OF USER, USER EQUIPMENT, BASE STATION, AND COMPUTER-READABLE MEDIUM

(71) Applicants: SHARP KABUSHIKI KAISHA, Sakai (JP); FG Innovation Company Limited, Tuen Mun (HK)

(72) Inventors: Ningjuan Chang, Shanghai (CN); Renmao Liu, Shanghai (CN)

(73) Assignees: SHARP KABUSHIKI KAISHA, Sakai (JP); FG Innovation Company Limited, New Territories (HK)

( * ) Notice: Subject to any disclaimer, the term of this patent is extended or adjusted under 35 U.S.C. 154(b) by 0 days.

(21) Appl. No.: 16/631,818

(22) PCT Filed: Jul. 13, 2018

(86) PCT No.: PCT/CN2018/095606
§ 371 (c)(1),
(2) Date: Jan. 16, 2020

(87) PCT Pub. No.: WO2019/015532
PCT Pub. Date: Jan. 24, 2019

(65) Prior Publication Data
US 2020/0169966 A1    May 28, 2020

(30) Foreign Application Priority Data

Jul. 21, 2017   (CN) .......................... 201710604330.5

(51) Int. Cl.
*H04W 52/36* (2009.01)
*H04W 52/32* (2009.01)
*H04W 72/04* (2009.01)

(52) U.S. Cl.
CPC ....... *H04W 52/365* (2013.01); *H04W 52/325* (2013.01); *H04W 72/0406* (2013.01); *H04W 72/0473* (2013.01)

(58) Field of Classification Search
CPC ........... H04W 72/0406; H04W 52/325; H04W 52/365
(Continued)

(56) References Cited

U.S. PATENT DOCUMENTS

2013/0107722 A1   5/2013  Huang
2016/0212737 A1   7/2016  Jang et al.

FOREIGN PATENT DOCUMENTS

CN    101772119 A    7/2010
CN    102291771 A    12/2011

OTHER PUBLICATIONS

Nokia et al., "PHR Enhancement for NB-IoT", R1-1806169, 3GPP TSG RAN WG1 Meeting #93 Busan, Korea, May 21-25, 2018.
3GPP TS 36323 V14.0.0 (Sep. 2016), 3rd Generation Partnership Project; Technical Specification Group Radio Access Network; Evolved Universal Terrestrial Radio Access (E-UTRA); Packet Data Convergence Protocol (PDCP) specification (Release 14).
(Continued)

*Primary Examiner* — Joel Ajayi
(74) *Attorney, Agent, or Firm* — ScienBiziP, P.C.

(57) ABSTRACT

The present disclosure provides a method performed at UE, including: receiving system information from a base station, the system information including indication information for indicating that or whether the base station supports an extended DPR; and determining, according to capability information for indicating that the UE supports an extended DPR and the received indication information for indicating that the base station supports an extended DPR, to transmit an extended DPR to the base station in Message 3. The present disclosure further provides a method performed at UE for reporting a capability as to that or whether an extended DPR is supported, a method performed at a base station for receiving an extended DPR, a method performed (Continued)

at a base station for requesting UE to report a capability as to that or whether an extended DPR is supported, corresponding UE and base stations, and a computer-readable medium.

4 Claims, 15 Drawing Sheets

(58) Field of Classification Search
USPC .......................................................... 455/450
See application file for complete search history.

(56) References Cited

OTHER PUBLICATIONS

3GPP TS 36322 V14.0.0 (Mar. 2017), 3rd Generation Partnership Project; Technical Specification Group Radio Access Network; Evolved Universal Terrestrial Radio Access (E-UTRA); Radio Link Control (RLC) protocol specification (Release 14).
3GPP TS 36321 V14.0.0 (Sep. 2016), 3rd Generation Partnership Project; Technical Specification Group Radio Access Network; Evolved Universal Terrestrial Radio Access (E-UTRA); Medium Access Control (MAC) protocol specification (Release 14).
Huawei, Hisilicon, Neul, "New WID on Further NB-IoT enhancements", RP-170852, #3GPP TSG RAN Meeting #75, Dubrovnik, Croatia, Mar. 6-9, 2017.
Ericsson Rapporteur, "Introduction of NB-IoT in 36.321", R2-164521, 3GPP TSG-RAN2 Meeting #94, Nanjing, China, May 23-27, 2016.

SHORT BSR AND TRUNCATED BSR

LONG BSR

METHOD RELATED TO POWER HEADROOM REPORT OF USER, USER EQUIPMENT, BASE STATION, AND COMPUTER-READABLE MEDIUM

TECHNICAL FIELD

The present disclosure relates to the field of wireless communications technologies. More specifically, the present disclosure relates to a method related to a power headroom report of a user in wireless communications, corresponding user equipment and a corresponding base station, and a computer-readable medium.

BACKGROUND

A new work project on further narrowband Internet of Things (NB-IoT) enhancements (see RP-170852: New WID on Further NB-IoT enhancements) was approved at the 3rd Generation Partnership Project (3GPP) RAN #75 plenary meeting held in March 2017. One of the objectives of the research project is to enhance user feedback, for example, to improve the feedback precision and the feedback value range of uplink power headroom of a user in new NB-IoT scenarios.

In view of the aforementioned needs and research objectives, the present disclosure focuses on and solves the problem of how to enhance power headroom feedback of a user in Release 15 and subsequent releases.

SUMMARY

The present disclosure aims to solve the aforementioned technical problem. Specifically, the present disclosure aims to solve the technical problem of how to enhance power headroom feedback of a user in Release 15 and subsequent releases.

In order to achieve the aforementioned objective, a first aspect of the present disclosure provides a method performed at user equipment (UE), the method comprising:

receiving system information from a base station, the system information comprising indication information for indicating that or whether the base station supports an extended data volume and power headroom report (DPR); and determining, according to capability information for indicating that the UE supports an extended DPR and the received indication information for indicating that the base station supports an extended DPR, to transmit an extended DPR to the base station in Message 3 (Msg3).

In one exemplary embodiment, the extended DPR is identified by a logical channel identity (LCID) in a medium access control (MAC) subheader used for a common control channel (CCCH) service data unit (SDU) or a separately set medium access control (MAC) subheader, and the value of the LCID is selected from reserved LCID values or is a reused LCID value used for identifying other MAC CEs.

In one exemplary embodiment, it is determined, according to the capability information for indicating that the UE supports an extended DPR and the received indication information for indicating that the base station supports an extended DPR, to transmit the extended DPR to the base station in Msg3 when at least one of the following conditions is satisfied:

the amount of data to be transmitted by the UE exceeds a first predetermined threshold;

a coverage enhancement level of the UE does not exceed a second predetermined threshold; and an electric quantity of the UE does not exceed a third predetermined threshold, wherein the first, second, and third predetermined thresholds are predefined by a system or acquired from a radio resource control (RRC) message transmitted by the base station.

A second aspect of the present disclosure provides a method performed at user equipment (UE), the method comprising:

receiving, from a base station, a UE capability enquiry message for requesting transfer of UE radio access capabilities; and transmitting a UE capability information message to the base station, the UE capability information message comprising indication information for indicating that or whether the UE supports an extended data volume and power headroom report (DPR).

A third aspect of the present disclosure provides user equipment (UE), comprising:

a communication interface, configured to perform communication;

a processor; and a memory, storing computer-executable instructions, wherein when executed by the processor, the instructions cause the processor to perform the methods in the first and second aspects.

A fourth aspect of the present disclosure provides a method performed at a base station, the method comprising:

transmitting system information to user equipment (UE), the system information comprising indication information for indicating that or whether the base station supports an extended data volume and power headroom report (DPR); and receiving from the UE a DPR transmitted in Message 3 (Msg3).

In one exemplary embodiment, the method further comprises:

determining whether the received DPR is an extended DPR or a conventional DPR by detecting the value of a logical channel identity (LCID) in a medium access control (MAC) subheader used for a common control channel (CCCH) service data unit (SDU) or a separately set medium access control (MAC) subheader, wherein it is determined that the received DPR is an extended DPR if it is detected that the LCID value is a reserved LCID value or a reused LCID value used for identifying other MAC CEs.

A fifth aspect of the present disclosure provides a method performed at a base station, the method comprising:

transmitting, to user equipment (UE), a UE capability enquiry message for requesting transfer of UE radio access capabilities; and receiving a UE capability information message from the UE, the UE capability information message comprising indication information for indicating that or whether the UE supports an extended data volume and power headroom report (DPR).

A sixth aspect of the present disclosure provides a base station, comprising:

a communication interface, configured to perform communication;

a processor; and a memory, storing computer-executable instructions, wherein when executed by the processor, the instructions cause the processor to perform the methods described above.

A seventh aspect of the present disclosure provides a computer-readable medium, storing instructions thereon, wherein when executed by a processor, the instructions cause the processor to perform the methods in the fifth and sixth aspects.

The aforementioned schemes provided in the present disclosure provide solutions for enhancing power headroom feedback of a user in Release 15 and subsequent releases. For example, through a DPR type determination method, the UE can determine whether the type of a DRP transmitted in Msg3 is a conventional DPR or an extended DPR.

Additional aspects and advantages of the present disclosure will be partially provided in the following description, which will become apparent from the description below or be understood through the practice of the present disclosure.

BRIEF DESCRIPTION OF THE DRAWINGS

The aforementioned and other features of the present disclosure will become more apparent with the following detailed description in conjunction with the accompanying drawings.

DETAILED DESCRIPTION

Figure 1:
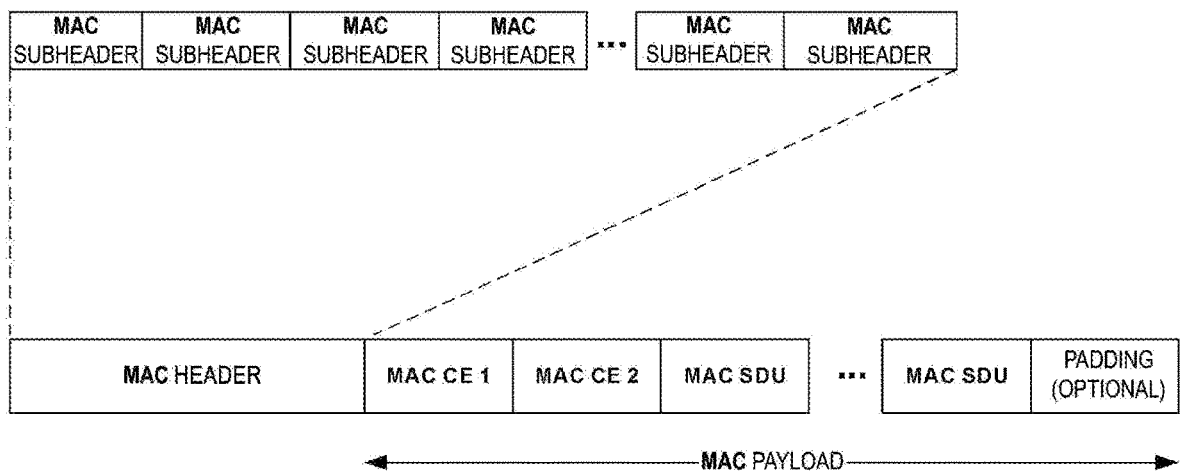
FIG. 1 schematically shows a MAC PDU format.

The following describes the present application in detail with reference to the accompanying drawings and specific embodiments. It should be noted that the present application should not be limited to the specific embodiments described below. In addition, for simplicity, detailed description of the known art not directly related to the present application is omitted to prevent confusion in understanding the present application.

Some terms involved in the present disclosure are described below. If not specifically indicated, the terms involved in the present disclosure use the definitions herein. The terms or information elements given in the present disclosure may be named differently in a 5G new radio access system (NR), a Long Term Evolution system (LTE), and an enhanced Long Term Evolution system (eLTE), but unified terms or information elements are used in the present disclosure. When applied to a specific system, the terms or information elements may be replaced with terms or information elements used in the corresponding system, and values of the information elements adopt those specified in the corresponding system. In the present disclosure, the base station may be a base station of any type, such as a Node B, an enhanced base station eNB, a base station gNB in a 5G communication system, a micro base station, a picocell base station, a macro base station, or a home base station; the cell may also be a cell covered by any type of base station described above. In the present disclosure, the base station, cell, and evolved UMTS terrestrial radio access network (Evolved UMTS (Universal Mobile Telecommunication System) Terrestrial Radio Access Network, E-UTRAN) may be interchangeable. The present disclosure may be applied to an NB-IOT system or may be applied to a machine type communication (MTC) system.

Some concepts involved in the present disclosure are described below.

Power Headroom (PH): transmit power headroom information of UE, user equipment (UE) transmit power headroom in LTE refers to, for each activated serving cell, the difference between the nominal maximum transmit power of the UE and estimated power for uplink shared channel (UL-SCH) or sounding reference signal (SRS) transmission; or may refer to, for a physical uplink control channel (Physical Uplink Control Channel, PUCCH) SCell and SpCell, the difference between the nominal maximum transmit power of the UE and estimated power for UL-SCH and PUCCH transmission. The PUCCH SCell refers to a secondary cell (SCell) provided with a PUCCH resource/channel; when dual connectivity (DC) is not configured, the SpCell refers to a primary cell (PCell), and when DC is configured, the SpCell refers to a PCell in a master cell group or a PSCell in a secondary cell group. In NB-IoT systems of Release 14 and earlier releases, power headroom refers to, for a serving cell, the difference information between the nominal maximum transmit power of UE and estimated power for UL-SCH transmission.

Power Headroom Report (PHR): UE provides power headroom information thereof to a base station through a PHR. Regarding the power headroom, please refer to the above description.

Data Volume (DV): information of the total amount of data available for transmission in an uplink buffer associated with a medium access control (MAC) entity. The data volume may also be referred to as a buffer size (BS). Reference may be made to protocols 36.321/36.322/36.323 in the 3GPP Technical Specification for the definition of the data available for transmission. Reference is made to Release 14 of the Technical Specification in the present disclosure. In the present disclosure, description thereof is not provided herein again.

Buffer Status Report (BSR): UE notifies, through a BSR, a base station of how much data in an uplink buffer thereof needs to be transmitted, so that the base station decides how many resources are to be allocated to the UE.

Message 3 (Msg3): uplink transmission transmitted using an uplink grant resource in a random access response message in a random access procedure. Message 3 is also described as a message transmitted on a UL-SCH and including a cell-radio network temporary identifier medium access control element (Cell-Radio Network Temporary identifier MAC Control Element, C-RNTI MAC CE) or a common control channel service data unit (CCCH SDU) (also referred to as a CCCH MAC SDU). A MAC layer acquires the message from an upper layer (radio resource control (RRC) layer). The message is associated with a UE contention resolution identity and is part of the random access procedure.

Coverage Enhancement Level (CE level): the extent of required coverage enhancement is divided into a plurality of enhanced coverage levels in the coverage enhancement technique. In some coverage enhancement methods, each enhanced coverage level may correspond to a different set of wireless parameter configurations, such as random access configurations (for example, PRACH (Physical Random Access Channel) resources). The coverage enhancement level may also be referred to as an enhanced coverage level (EC level).

MAC Protocol Data Unit: MAC PDU. The MAC PDU refers to a data packet of a MAC layer, the format of which is shown in FIG. 1 and includes two portions: a MAC header and a MAC payload. The MAC header may also be referred to as a MAC PDU header, which includes a plurality of MAC subheaders (also referred to as MAC PDU subheaders). Each MAC subheader corresponding to a MAC CE or a MAC SDU or padding bits in the MAC payload portion. The MAC payload portion includes zero or a plurality of MAC CEs and zero or a plurality of MAC SDUs, and possible padding bits.

Figure 2:
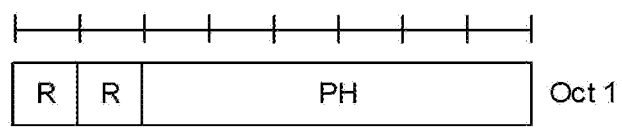
FIG. 2 schematically shows a conventional PHR MAC CE format when CA and DC are not configured.

A plurality of PHR formats are defined In LTE systems of Release 14 and earlier releases. A format of a PHR when carrier aggregation (CA) and DC are not configured is shown in FIG. 2. A base station performs PHR configuration through an RRC message, including configuration of PHR-related parameters (for example, the value of a periodic PHR timer, the value of a prohibit PHR timer, or a downlink path loss change threshold for judging PHR triggering), release of the PHR, and so on. When the UE is provided with PHR configuration information, a PHR reporting procedure is performed according to the PHR configuration information; when the UE is not provided with or is de-configured from a PHR (the PHR is released), no PHR reporting procedure is performed. As a separate MAC CE, the PHR corresponds to a MAC subheader when the PHR needs to be transmitted, where a logical channel identity (LCID) adopts the value "11010."

Figure 3:
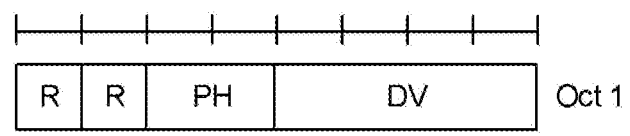
FIG. 3 schematically shows a conventional DPR MAC CE format.

In NB-IoT systems of Release 14 and earlier releases, considering the service features of NB-IoT such as small data packets and small data volumes, NB-IoT supports only reporting of a PHR together with Msg3 in a random access process, and uses a data volume and power headroom reporting (DPR) MAC CE. The format of the MAC CE is shown in FIG. 3. That is, for NB-IoT, PH is reported only once and is reported together with a data volume as a MAC CE. In the DPR MAC CE, R bits represent reserved bits and are set to 0; a PH field for transmitting power headroom information occupies 2 bits and can represent 4 different PH levels; and a DV field for transmitting data volume information occupies 4 bits and can represent 16 different data volume values. The DPR MAC CE is transmitted together with a CCCH SDU in Msg3. The DPR MAC CE is identified by a MAC subheader used for the CCCH SDU, does not require any additional MAC subheader, and is always placed before the CCCH SDU in the MAC PDU. In the MAC subheader corresponding to the CCCH SDU, the LCID adopts the value "00000."

Figure 4:
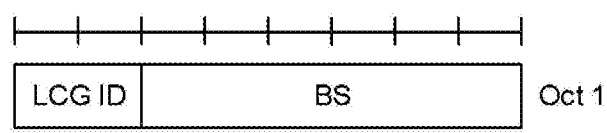
FIG. 4 schematically shows two conventional BSR formats.
Figure 4:
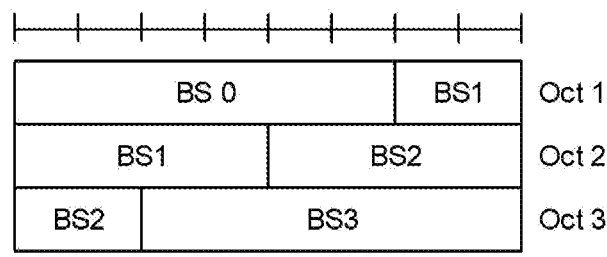

Two BSR formats are defined in LTE systems of Release 14 and earlier releases, as shown in FIG. 4. A base station configures BSR parameters (for example, the value of a periodic BSR timer or a retransmission BSR timer) through an RRC message. As a separate MAC CE, the BSR corresponds to a MAC subheader when the BSR needs to be transmitted, where an LCID corresponding to a short BSR is of the value "11101"; an LCID corresponding to a truncated BSR is of the value "11100"; and an LCID corresponding to a long BSR is of the value "11110." The NB-IoT system does not support a long BSR, and all logical channels belong to one logical channel group.

Embodiments of the present disclosure provide a PH enhancement scheme for the new needs of NB-IoT in Release 15. Through the method in the present disclosure, UE can learn that or whether a base station supports enhanced PH feedback, and when both the UE and the system support enhanced PH feedback, the UE can apply an enhanced PH feedback procedure to report more accurate PH information to the base station for use in the subsequent uplink scheduling scheme, thereby achieving the purpose of conserving energy of the UE and rationally utilizing power of the UE.

In the present disclosure, unlike DPRs of Release 14 and earlier releases (referred to as conventional DPRs in the present disclosure), enhanced DPRs transmitted in Msg3 and/or after Msg3 in Release 15 and subsequent releases are referred to as enhanced DPRs (which will be defined in the technical specification document 36.321), whereas enhanced DPRs transmitted in Msg3 in Release 15 and subsequent releases are referred to as extended DPRs. That is, "extended DPRs" and "enhanced DPRs" can be used interchangeably when referring to DPRs transmitted in Msg3 in Release 15 and subsequent releases. However, a person skilled in the art should understand that although used as such in the present disclosure, enhanced DPRs of Release 15 and subsequent releases are not limited to the two names, and may also be referred to as, for example, long DPRs. A DPR MAC CE may also be referred to as a DPR for short; a BSR MAC CE may also be referred to as a BSR for short; a PHR MAC CE may also be referred to as a PHR for short.

A method performed at UE for transmitting an extended DPR according to an exemplary embodiment of the present disclosure will be described below with reference to FIG. 5.

Figure 5:
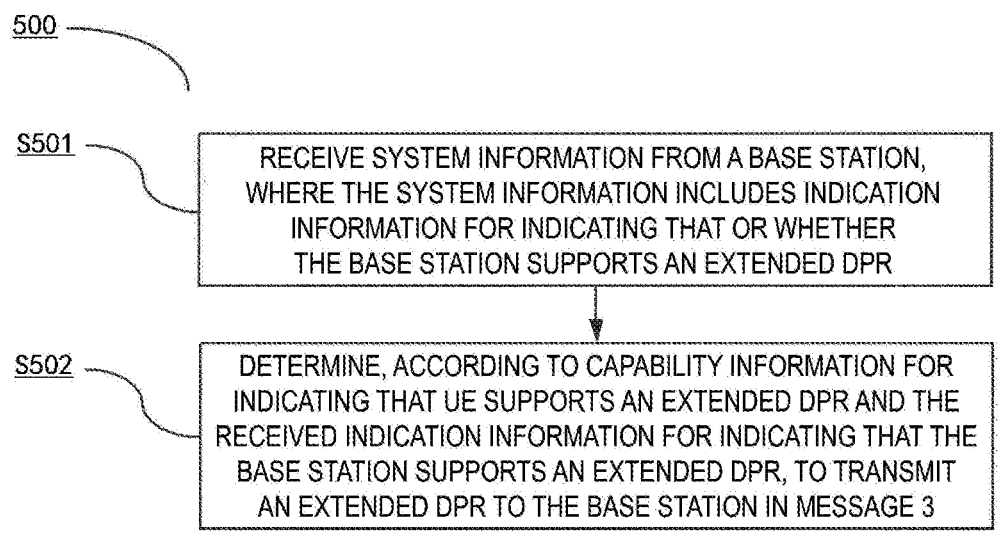
FIG. 5 schematically shows a flowchart of a method performed at UE for transmitting an extended DPR according to an exemplary embodiment of the present disclosure.

FIG. 5 shows a flowchart of a method 500 performed at UE for transmitting an extended DPR according to an exemplary embodiment of the present disclosure. As shown in FIG. 5, the method 500 may include steps S501 and S502.

In step S501, UE (for example, NB-IoT UE, the same below) can receive system information from a base station, where the system information includes indication information (hereinafter referred to as first indication information to avoid confusion), and the indication information is used for indicating that the base station supports (or allows, which are interchangeable, the same below) an extended DPR or indicating whether the base station supports an extended DPR.

Specifically, the first indication information may indicate that or whether a cell served by the base station allows an extended DPR or allows transmitting an extended DPR. Preferably, if the first indication information is present, then the cell allows an extended DPR or allows transmitting an extended DPR; if the first indication information is not present, then the cell does not allow an extended DPR or does not allow transmitting an extended DPR. Alternatively, if the first indication information is set to "TRUE" or "1," then the cell allows an extended DPR or allows transmitting an extended DPR; if the first indication information is set to "FALSE" or "0," then the cell does not allow an extended DPR or does not allow transmitting an extended DPR. Preferably, the first indication information is included in the system information such as a system information block 1 or system information block 2, and the system information can be carried in an RRC message.

In another implementation of step S501, the UE may judge that or whether the RRC message received from the base station includes an RRC information element specific to Release 15 or subsequent releases. If so, then the UE can determine that the base station is a base station of Release 15 or a base station of a release subsequent to Release 15. That is, the UE can determine that the base station allows an extended DPR or allows transmitting an extended DRP or supports an extended DPR. Otherwise, if the RRC message does not include an RRC information element specific to Release 15 or subsequent releases, then the UE can determine that the base station is a base station of Release 14 or a base station of a release preceding Release 14. That is, the UE can determine that the base station does not allow an extended DPR or does not allow transmitting an extended DRP or does not support an extended DPR. Preferably, the RRC message is a system information message. In this implementation, it is assumed that all base stations of Release 15 and base stations of subsequent releases support or allow an extended DPR.

Next, the UE may determine the type of a DPR to be transmitted to the base station in Msg3 based on capabilities of the UE and the base station as to that or whether an extended DPR is supported. The DPR type includes a conventional DPR and an extended DPR. Herein, the extended DPR is a new DPR MAC CE defined to expand the range and precision of a PH value in a conventional DPR, and is referred to as an extended DPR MAC CE or an extended DPR for short.

In step S402, the UE can, according to capability information that the UE supports an extended DPR and the received first indication information for indicating that the base station supports an extended DPR, determine to transmit an extended DPR to the base station in Msg3, or include an extended DPR in Msg3, or instruct a multiplexing and assembly procedure to generate and transmit an extended DPR.

If the UE does not support an extended DPR or the received first indication information indicates that the base station does not support an extended DPR, then the UE determines to transmit a conventional DPR to the base station in Msg3, or include a conventional DPR in Msg3, or instruct a multiplexing and assembly procedure to generate and transmit a conventional DPR.

In another embodiment, the UE may determine the type of a DPR to be transmitted to the base station in Msg3 based on capabilities of the UE and the base station as to that or whether an extended DPR is supported and according to that or whether a predetermined condition is satisfied.

In step S502 in this embodiment, the UE may determine to transmit an extended DPR to the base station in Msg3 according to capability information for indicating that the UE supports an extended DPR and the received first indication information for indicating that the base station supports an extended DPR when at least one of the following conditions is satisfied:

the amount of data to be transmitted by the UE exceeds a first predetermined threshold;

a coverage enhancement level of the UE does not exceed a second predetermined threshold; and an electric quantity of the UE does not exceed a third predetermined threshold.

Specifically, if the UE supports an extended DPR, the base station also supports an extended DPR, and at least one of the aforementioned predetermined conditions is satisfied, then the UE determines to transmit an extended DPR in Msg3, or cause an extended DPR to be included in Msg3, or instruct a multiplexing and assembly procedure to generate and transmit an extended DPR.

If the UE does not support an extended DPR, or the base station does not support an extended DPR, or at least one of the aforementioned predetermined conditions is not satisfied, then the UE determines to transmit a conventional DPR in Msg3, or cause a conventional DPR to be included in Msg3, or instruct a multiplexing and assembly procedure to generate and transmit a conventional DPR.

Specifically, the predetermined condition may be that or whether the UE has more data to be transmitted or that or whether the amount of data to be transmitted exceeds the first predetermined threshold. The predetermined condition being satisfied means that more data needs to be transmitted, or the amount of data to be transmitted exceeds the first predetermined threshold; the predetermined condition being not satisfied means that no more data needs to be transmitted or the amount of data to be transmitted does not exceed the first predetermined threshold.

Alternatively, the predetermined condition may also be that or whether a coverage enhancement level of the UE does not exceed the second predetermined threshold. The predetermined condition being satisfied means that the coverage enhancement level of the UE does not exceed the second predetermined threshold; the predetermined condition being not satisfied means that the coverage enhancement level of the UE exceeds the second predetermined threshold. In another implementation, the predetermined condition may also be that or whether a coverage enhancement level of the UE is not lower than the second predetermined threshold. The predetermined condition being satisfied means that the coverage enhancement level of the UE is not lower than the second predetermined threshold; the predetermined condition being not satisfied means that the coverage enhancement level of the UE is lower than the second predetermined threshold.

Alternatively, the predetermined condition may also be that or whether an electric quantity of the UE is a low electric quantity or that or whether the electric quantity of the UE does not exceed the third predetermined threshold. The predetermined condition being satisfied means that the electric quantity of the UE is a low electric quantity or the electric quantity of the UE does not exceed the third predetermined threshold; the predetermined condition being not satisfied means that the electric quantity of the UE is not a low electric quantity, or the electric quantity of the UE exceeds the third predetermined threshold. The electric quantity of the UE may refer to a battery level of the UE.

In this embodiment, the first, second, and third predetermined thresholds may be predefined by a system or acquired from an RRC message transmitted by the base station. The RRC message may be a dedicated RRC message, such as an RRC connection reconfiguration message or a system information message.

The specific setting of causing an extended DPR or a conventional DPR to be carried in Msg3 will be described below in two exemplary embodiments respectively. The setting enables the UE to differently identify a conventional DRP and an extended DPR when transmitting a DPR in Msg3 so that the base station receiving the DPR can also identify whether the received DPR is a conventional DPR or an extended DPR so as to perform correct decoding/parsing.

In a first embodiment, like a conventional DPR, an extended DPR shares a MAC subheader with a CCCH SDU without any additional MAC subheader added and is always placed before the CCCH SDU. The extended DPR is identified by an LCID in the MAC subheader used for the CCCH SDU. Unlike the conventional DPR, the LCID value used for identifying the extended DPR is selected from reserved LCID values 01101 to 10011, for example, "01101." Alternatively, the LCID value may also be a reused LCID value used for identifying other MAC CEs in an LTE system, for example, a reused LCID "11110" of a long BSR, or a reused LCID "11101" of a short BSR, or a reused LCID "11100" of a truncated BSR, or a reused LCID "11010" of a PHR, or a reused LCID "11001" of an extended PHR, or a reused LCID "11000" of a dual connectivity PHR. Since the aforementioned MAC Ces corresponding to reused LCIDs and the extended DPR do not appear in msg3 at the same time, reuse of LCIDs corresponding to the MAC Ces does not cause confusion.

For the UE, if it is determined that an extended DPR is to be transmitted, then the new LCID value, for example, the LCID "01101," is used to indicate the CCCH SDU; otherwise (if it is determined that a conventional DPR is to be transmitted), the UE uses the LCID "00000" to indicate the CCCH SDU.

The determining that an extended DPR MAC CE is to be transmitted may also be described as the following: an extended DPR is to be transmitted or an extended DPR is included in a MAC PDU.

In a second embodiment, unlike a conventional DPR, an extended DPR corresponds to a MAC subheader separately set for the extended DPR. That is, the MAC subheader corresponding to the extended DPR is not shared with any CCCH SDU or other MAC SDUs/Ces. The extended DPR is identified by an LCID in the corresponding MAC subheader thereof. The LCID value used for identifying the extended DPR is selected from reserved LCID values 01101 to 10011, for example, "01101." Alternatively, the LCID value may also be a reused LCID value corresponding to other MAC Ces in an LTE system, for example, a reused LCID "11110" of a long BSR, or a reused LCID "11101" of a short BSR, or a reused LCID "11100" of a truncated BSR, or a reused LCID "11010" of a PHR, or a reused LCID "11001" of an extended PHR, or a reused LCID "11000" of a dual connectivity PHR. Since the aforementioned MAC Ces corresponding to reused LCIDs and the extended DPR do not appear in msg3 at the same time, reuse of LCIDs corresponding to the MAC Ces does not cause confusion.

For the UE, if it is determined that an extended DPR MAC CE is to be transmitted, then a corresponding MAC subheader thereof is included in a MAC PDU, or a MAC subheader is built (or created or added) for the extended DPR, or the extended DPR is indicated by a corresponding MAC subheader or indicated by a corresponding MAC subheader and a corresponding LCID; otherwise (if it is determined that a conventional DPR is to be transmitted), the DPR is represented by a MAC subheader used for a CCCH SDU without any additional subheader added.

For the extended DPR, the location thereof in the MAC PDU may be any location before a MAC SDU and after a MAC header, that is, not limited to being only before the CCCH SDU.

The determining that an extended DPR MAC CE is to be transmitted may also be described as that an extended DPR is to be transmitted or described as that an extended DPR is included in a MAC PDU.

In one example, the LCID used in the MAC subheader of the CCCH SDU in the second embodiment is "00000."

That is, the extended DPR may be identified by an LCID in a MAC subheader used for a CCCH SDU or a separately set MAC subheader, and the value of the LCID is selected from reserved LCID values or is a reused LCID value used for identifying other MAC Ces.

Although the complete process of transmitting an extended DPR at UE is described above, the embodiment of the present disclosure not only includes the aforementioned complete process, but also includes separate implementations related to an extended DPR described in the following embodiments.

Mechanism of Enhanced DPR Transmitted in Msg3—UE Side

In embodiments of this section, in order to expand the range and precision of a PH value in a DPR, a new DPR MAC CE format needs to be defined, which is referred to as an extended DRP MAC CE.

UE-Side Embodiment 1

This embodiment provides a method for distinguishing between a conventional DPR and an extended DPR. Through this embodiment, UE can differently identify a conventional DRP and an extended DPR when transmitting a DPR so that a receiving side of the DPR, namely, a base station, can also identify whether the received DPR is a conventional DPR or an extended DPR so as to perform correct decoding/parsing.

In this embodiment, like a conventional DPR, an extended DPR is identified by a MAC subheader used for a CCCH SDU without any additional MAC subheader added, and is always placed before the CCCH SDU. Unlike the conventional DPR, an LCID for identifying the extended DPR in the MAC subheader used for a CCCH SDU is a different LCID value that is selected from reserved LCID values 01101 to 10011, for example, "01101." Alternatively, the LCID value may also be a reused LCID value corresponding to other MAC Ces in an LTE system, for example, a reused LCID "11110" of a long BSR, or a reused LCID "11101" of a short BSR, or a reused LCID "11100" of a truncated BSR, or a reused LCID "11010" of a PHR, or a reused LCID "11001" of an extended PHR, or a reused LCID "11000" of a dual connectivity PHR. Since the aforementioned MAC Ces corresponding to reused LCIDs and the extended DPR do not appear in msg3 at the same time, reuse of LCIDs corresponding to the MAC Ces does not cause confusion.

For the UE, if it is determined that an extended DPR is to be transmitted, then the new LCID value, for example, the LCID "01101," is used to indicate the CCCH SDU; otherwise (if it is determined that a conventional DPR is to be transmitted), the UE uses the LCID "00000" to indicate the CCCH SDU.

The determining that an extended DPR MAC CE is to be transmitted may also be described as that an extended DPR is to be transmitted or described as that an extended DPR is included in a MAC PDU. Optionally, the determining that an extended DPR MAC CE is to be transmitted may adopt, but not limited to, the following methods in UE-side embodiments 3 to 5. With reference to UE-side embodiments 3 and 6, the determining that an extended DPR MAC CE is to be transmitted is described as NB-IoT UE supporting an extended DPR or that first indication information is included (or indicated) in system information; the determining that a conventional DPR is to be transmitted may be described as that NB-IoT UE does not support an extended DPR or first indication information is not included (or not indicated) in system information.

UE-Side Embodiment 2

This embodiment provides another method for distinguishing between a conventional DPR and an extended DPR. Through this embodiment, UE can differently identify a conventional DRP and an extended DPR when transmitting a DPR so that a receiving side of the DPR, namely, a base station, can also identify whether the received DPR is a conventional DPR or an extended DPR so as to perform correct decoding/parsing.

In this embodiment, unlike a conventional DPR, an extended DPR corresponds to a MAC subheader. That is, the MAC subheader corresponding to the extended DPR is not shared with any CCCH SDU or other MAC SDUs/Ces. The extended DPR is identified by an LCID in the corresponding MAC subheader thereof. For example, preferably, the LCID may be a new value "10011." Alternatively, the LCID value may also be a reused LCID value corresponding to other MAC Ces in an LTE system, for example, a reused LCID "11110" of a long BSR, or a reused LCID "11101" of a short BSR, or a reused LCID "11100" of a truncated BSR, or a reused LCID "11010" of a PHR, or a reused LCID "11001" of an extended PHR, or a reused LCID "11000" of a dual connectivity PHR. Since the aforementioned MAC Ces corresponding to reused LCIDs and the extended DPR do not appear in msg3 at the same time, reuse of LCIDs corresponding to the MAC Ces does not cause confusion.

For the UE, if it is determined that an extended DPR MAC CE is to be transmitted, then a corresponding MAC subheader thereof is included in a MAC PDU, or a MAC subheader is built (or created or added) for the extended DPR, or the extended DPR is indicated by a corresponding MAC subheader or indicated by a corresponding MAC subheader and a corresponding LCID; otherwise (if it is determined that a conventional DPR is to be transmitted), the DPR is represented by a MAC subheader used for a CCCH SDU without any additional subheader added.

For the extended DPR, the location thereof in the MAC PDU may be any location before a MAC SDU and after a MAC header, that is, not limited to being only before the CCCH SDU.

The determining that an extended DPR MAC CE is to be transmitted may also be described as the following: an extended DPR is to be transmitted, or an extended DPR is included in a MAC PDU. Optionally, the determining that an extended DPR MAC CE is to be transmitted may adopt, but not limited to, the following methods in UE-side embodiments 3 to 5. With reference to UE-side embodiments 3 and 6, the determining that an extended DPR MAC CE is to be transmitted is described as NB-IoT UE supporting an extended DPR or that first indication information is included (or indicated) in system information; the determining that a conventional DPR is to be transmitted may be described as that NB-IoT UE does not support an extended DPR or first indication information is not included (or not indicated) in system information.

Furthermore, in this embodiment, the LCID in the MAC subheader used for the CCCH SDU is "00000."

UE-Side Embodiment 3

This embodiment provides a method used by UE to determine the type of a DPR to be transmitted in Msg3. The DPR type includes a conventional DPR and an extended DPR.

In this embodiment, the UE determines the type of a DPR to be transmitted based on capabilities of the UE and a base station as to that or whether an extended DPR is supported. If the UE supports an extended DPR and the base station also supports an extended DPR, then the UE determines to transmit an extended DPR in Msg3 or include an extended DPR in Msg3 or instruct a multiplexing and assembly procedure to generate and transmit an extended DPR; otherwise (if the UE does not support an extended DPR or the base station does not support an extended DPR), the UE determines to transmit a conventional DPR in Msg3, or include a conventional DPR in Msg3, or instruct a multiplexing and assembly procedure to generate and transmit a conventional DPR.

With reference to UE-side Embodiment 6, the base station supporting an extended DPR may be described as: the first indication information is included (or indicated) in system information. The base station not supporting an extended DPR may be described as: the first indication information is not included (or not indicated) in system information.

UE-Side Embodiment 4

This embodiment provides a method used by UE to determine the type of a DPR to be transmitted in Msg3. The DPR type includes a conventional DPR and an extended DPR.

In this embodiment, the UE determines the type of a DPR to be transmitted based on capabilities of the UE and a base station as to that or whether an extended DPR is supported and according to that or whether a predetermined condition is satisfied.

If the UE supports an extended DPR and the base station also supports an extended DPR, then when the predetermined condition is satisfied, the UE determines to transmit an extended DPR in Msg3, or cause an extended DPR to be included in Msg3, or instruct a multiplexing and assembly procedure to generate and transmit an extended DPR; otherwise (if the UE does not support an extended DPR, or the base station does not support an extended DPR, or the predetermined condition is not satisfied), the UE determines to transmit a conventional DPR in Msg3, or cause a conventional DPR to be included in Msg3, or instruct a multiplexing and assembly procedure to generate and transmit a conventional DPR.

In one implementation, the predetermined condition is that or whether more data needs to be transmitted or that or whether the amount of data to be transmitted exceeds a first predetermined threshold. The predetermined condition being satisfied means that more data needs to be transmitted, or the amount of data to be transmitted is greater than or greater than or equal to the first predetermined threshold. The predetermined condition being not satisfied means that no more data needs to be transmitted, or the amount of data to be transmitted is less than or less than or equal to the first predetermined threshold.

In another implementation, the predetermined condition may also be that or whether a coverage enhancement level of the UE does not exceed the second predetermined threshold. The predetermined condition being satisfied means that the coverage enhancement level of the UE does not exceed the second predetermined threshold; the predetermined condition being not satisfied means that the coverage enhancement level of the UE exceeds the second predetermined threshold. In another implementation, the predetermined condition may also be that or whether a coverage enhancement level of the UE is not lower than the second predetermined threshold. The predetermined condition being satisfied means that the coverage enhancement level of the UE is not lower than the second predetermined threshold; the predetermined condition being not satisfied means that the coverage enhancement level of the UE is lower than the second predetermined threshold.

In a further implementation, the predetermined condition is that or whether an electric quantity of the UE is a low electric quantity or that or whether the electric quantity of the UE is lower than a third predetermined threshold. The predetermined condition being satisfied means that the electric quantity of the UE is a low electric quantity or the electric quantity of the UE is less than or less than or equal to the third predetermined threshold. The predetermined condition being not satisfied means that the electric quantity of the UE is not a low electric quantity, or the electric quantity of the UE is greater than or greater than or equal to the third predetermined threshold. The electric quantity of the UE may refer to a battery level of the UE.

Optionally, before the UE determines the type of the DPR to be transmitted in Msg3, the method further includes the UE acquiring a threshold (including the first predetermined threshold or second predetermined threshold or third predetermined threshold) in the predetermined condition. The threshold in the predetermined condition may be predefined by a system or may be acquired by the UE from the base station through an RRC message. Furthermore, the RRC message may be a dedicated RRC message, such as an RRC connection reconfiguration message or system information.

With reference to UE-side Embodiment 6, the base station supporting an extended DPR may be described as: first indication information is included (or indicated) in system information. The base station not supporting an extended DPR may be described as: first indication information is not included (or not indicated) in system information.

UE-Side Embodiment 5

This embodiment provides a method used by UE to determine the type of a DPR to be transmitted in Msg3. The DPR type includes a conventional DPR and an extended DPR.

If the UE supports an extended DPR and the base station also supports an extended DPR, then the UE randomly selects the type of a DPR to be transmitted in Msg3. If the UE determines to transmit an extended DPR in Msg3, then the UE causes an extended DPR to be included in Msg3 or instruct a multiplexing and assembly procedure to generate and transmit an extended DPR; otherwise (if the UE does not support an extended DPR, or the base station does not support an extended DPR, or the UE determines to transmit a conventional DPR in Msg3), the UE causes a conventional DPR to be included in Msg3 or instruct a multiplexing and assembly procedure to generate and transmit a conventional DPR.

With reference to UE-side Embodiment 6, the base station supporting an extended DPR may be described as: first indication information is included (or indicated) in system information. The base station not supporting an extended DPR may be described as: first indication information is not included (or not indicated) in system information.

UE-Side Embodiment 6

This embodiment provides a method used by UE to acquire information for indicating that or whether a base station supports an extended DPR. The terms "support" and "allow" can be replaced with each other.

In one implementation, the UE receives a first indication information from the base station, where the indication information is used for indicating that (whether) the cell allows an extended DPR or allows transmitting of an extended DPR. Preferably, if the indication information is present, then the cell allows an extended DPR or allows transmitting an extended DPR; if the indication information is not present, then the cell does not allow an extended DPR or does not allow transmitting an extended DPR. Alternatively, if the indication information is set to "TRUE" or "1," then the cell allows an extended DPR or allows transmitting an extended DPR; if the indication information is set to "FALSE" or "0," then the cell does not allow an extended DPR or does not allow transmitting an extended DPR. Preferably, the indication information is included in system information such as a system information block 1 or system information block 2.

In one implementation, the UE receives an RRC message from the base station. If the RRC message includes an RRC information element specific to Release 15 or subsequent releases, then the UE considers that the base station is a base station of Release 15 or a base station of a release subsequent to Release 15. That is, the UE considers that the base station allows an extended DPR or allows transmitting an extended DRP or supports an extended DPR. Otherwise, if the RRC message does not include an RRC information element specific to Release 15 or subsequent releases, then the UE considers that the base station is a base station of Release 14 or a base station of a release preceding Release 14. That is, the UE considers that the base station does not allow an extended DPR or does not allow transmitting an extended DRP or does not support an extended DPR. Preferably, the RRC message is system information. In this implementation, it is considered that all base stations of Release 15 and base stations of subsequent releases support or allow an extended DPR.

A method performed at UE for reporting a capability as to that or whether an extended DPR is supported according to an exemplary embodiment of the present disclosure will be described below with reference to FIG. 6.

Figure 6:
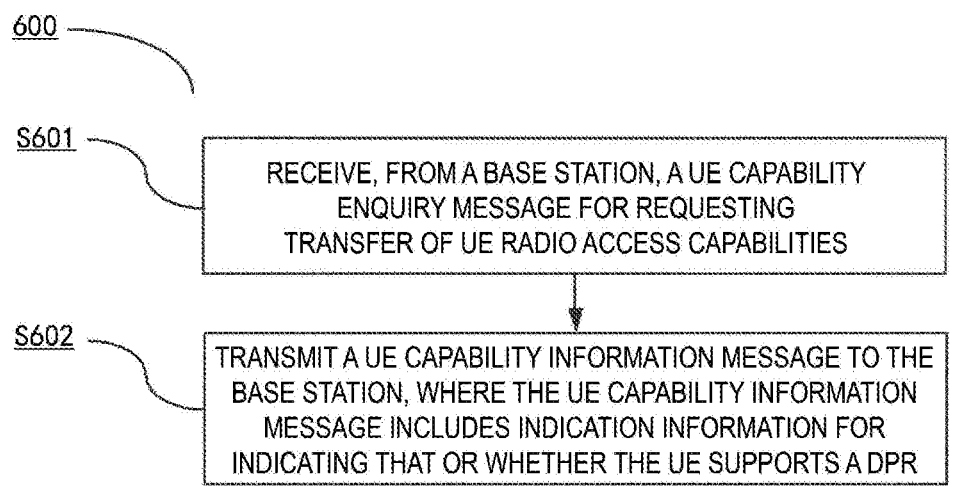
FIG. 6 schematically shows a flowchart of a method performed at UE for reporting a capability as to whether an extended DPR is supported according to an exemplary embodiment of the present disclosure.

FIG. 6 schematically shows a flowchart of a method 600 performed at UE for reporting a capability as to whether an extended DPR is supported according to an exemplary embodiment of the present disclosure. As shown in FIG. 6, the method 600 may include steps S601 and S602.

In step S601, the UE may receive a UE capability enquiry (UECapabilityEnquiry) message from a base station, where the UE capability enquiry message is used for requesting transfer of UE radio access capabilities. The UE radio access capabilities include E-UTRA radio access capabilities and radio access capabilities of other radio access technologies.

In step S602, the UE may transmit a UE capability information (UECapabilityInformation) message to the base station, where the UE capability information message includes indication information (hereinafter referred to as second indication information to avoid confusion) for indicating that or whether the UE supports an extended DPR. In one example, if the second indication information is set to "supported," then it is indicated that the UE supports an extended DPR; if the second indication information does not exist, then it is indicated that the UE does not support an extended DPR.

Optionally, the second indication information may be used to distinguish between a time division duplex (TDD) system and a frequency division duplex (FDD) system. That is, the second indication information may include two portions: one portion for indicating that or whether the UE supports an extended DPR for the TDD system; the other portion for indicating that or whether the UE supports an extended DPR for the FDD system.

A format of an extended DPR MAC CE according to an exemplary embodiment of the present disclosure will be described below with reference to FIG. 7 and FIG. 8. It should be noted that the format provided in the following embodiment is merely an example, and formats of the extended DPR in other embodiments of the present disclosure are not limited to the example in this embodiment.

Figure 7:
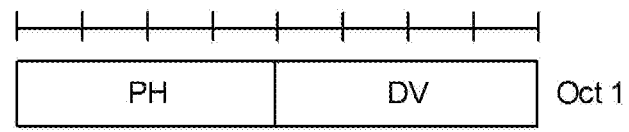
FIG. 7 schematically shows a format of an extended DPR MAC CE according to an exemplary embodiment of the present disclosure.

Referring to FIG. 7, one format of an extended DPR MAC CE is shown. In this format, the DPR has a fixed length of 1 byte, where a DV field occupies 4 bits and a PH field occupies 4 bits. The PH of 4 bits can represent 16 PH levels. Alternatively, the PH field occupies 3 bits and the remaining bits are reserved bits set to 0.

Figure 8:
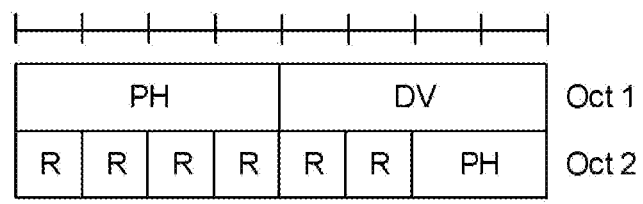
FIG. 8 schematically shows another format of an extended DPR MAC CE according to an exemplary embodiment of the present disclosure.

Referring to FIG. 8, another format of an extended DPR MAC CE is shown. In this format, the DPR has a fixed length of 2 bytes, where a DV field occupies 4 bits, a PH field occupies 6 bits, and the other bits may be used for other purposes, for example, a UE request in Additional Embodiment 6 that will be described later, or may be reserved bits set to "0." The PH of 6 bits can represent 64 PH levels. The length of each of the fields is merely an example. For example, the DV field may also be of 6 bits.

Other exemplary embodiments of the present disclosure performed at the UE side will be described below.

Mechanism of Transmitting Enhanced DPR after Msg3—UE Side

UE-Side Embodiment 7

Figure 9:
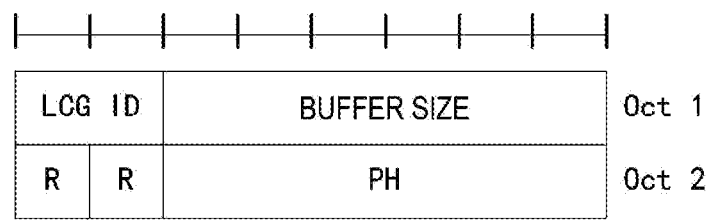
FIG. 9 schematically shows a format of an enhanced BPR MAC CE according to an exemplary embodiment of the present disclosure.

This embodiment provides a method for transmitting a PHR after Msg3. In this method, the PHR and a BSR may be triggered together, or the PHR and the BSR may be transmitted together. The PHR and the BSR being triggered together may mean that the PHR is always triggered when the BSR is triggered for a MAC entity; or the BSR is triggered when the PHR is triggered. The PHR and the BSR being transmitted together means that PH information and BS information are transmitted through a single MAC CE, which, like a DPR, is referred to as a buffer size and power headroom report (BPR) MAC CE or enhanced BPR in the present disclosure. An example of the format of the BPR MAC CE is shown in FIG. 9.

A separate LCID may be used to indicate the BPR MAC CE. The BPR MAC CE corresponds to a MAC subheader. The UE or MAC entity transmits a BPR when the following condition is satisfied: a current TTI has available resources and has both a BSR waiting to be transmitted and a waiting PHR. Otherwise, when the current TTI has available resources but has only a waiting BSR, the BSR is transmitted; or when the current TTI has available resources but has only a waiting PHR, the PHR is transmitted.

Optionally, the UE may receive enable information from a base station, where the enable information is used for enabling the BSR and the PHR to be triggered together and/or the BPR to be transmitted as described above.

Mechanism of Transmitting PHR after Msg3-UE Side

In the present disclosure, a PHR transmitted after Msg3 may also be described as a PHR after Msg3 or described as the following: a PHR not in Msg3, or a PHR not transmitted together with Msg3, or PHR MAC CE transmission.

UE-Side Embodiment 8

This embodiment provides a method used by UE to acquire whether a base station supports transmitting a PHR after Msg3. In one implementation, the UE receives third indication information from the base station, where the third indication information is used for indicating that (whether) the cell allows transmitting a PHR after Msg3. Alternatively, the indication information is used for indicating that (whether) the cell supports transmitting a PHR after Msg3. Preferably, if the third indication information exists, then the cell allows transmitting a PHR after Msg3 or the cell supports transmitting a PHR after Msg3; if the indication information does not exist, then the cell does not allow transmitting a PHR after Msg3 or the cell does not support transmitting a PHR after Msg3. Alternatively, if the indication information is set to "TRUE" or "1," then the cell allows transmitting a PHR after Msg3 or the cell supports transmitting a PHR after Msg3; if the indication information is set to "FALSE" or "0," then the cell does not allow transmitting a PHR after Msg3 or the cell does not support transmitting a PHR after Msg3. Preferably, the third indication information is included in system information such as a system information block 1 or system information block 2. Alternatively, the third indication information is included in a dedicated RRC message such as an RRC connection reconfiguration message, or an RRC connection establishment message, or an RRC connection reestablishment message, or an RRC connection resume message, and more specifically, included in a MAC-mainconfig information element in an RRC message.

In one implementation, the UE receives an RRC message from the base station. If the RRC message includes an RRC information element specific to Release 15 or subsequent releases, then the UE considers that the base station is a base station of Release 15 or a base station of a release subsequent to Release 15. That is, the UE considers that the base station allows transmitting a PHR after Msg3 or supports transmitting a PHR after Msg3. Otherwise, if the RRC message does not include an RRC information element specific to Release 15 or subsequent releases, then the UE considers that the base station is a base station of Release 14 or a base station of a release preceding Release 14. That is, the UE considers that the base station does not allow transmitting a PHR after Msg3 or does not support transmitting a PHR after Msg3. Preferably, the RRC message is system information. In this implementation, it is considered that all base stations of Release 15 and base stations of subsequent releases support or allow transmitting a PHR after Msg3.

UE-Side Embodiment 9

This embodiment provides a method performed at UE for reporting a capability as to whether the UE supports transmitting a PHR after Msg3.

Step 1: the UE receives a UE capability enquiry (UECapabilityEnquiry) message from a base station, where the message is used for requesting transfer of UE radio access capabilities. The UE radio access capabilities include E-UTRA radio access capabilities and radio access capabilities of other radio access technologies.

Step 2: the UE transmits a UE capability information (UECapabilityInformation) message to the base station, where the message includes fourth indication information for indicating that or whether the UE supports transmitting a PHR after Msg3. Furthermore, if the fourth indication information is set to "supported," then it is indicated that the UE supports transmitting a PHR after Msg3; if the indication information does not exist, then it is indicated that the UE does not support transmitting a PHR after Msg3.

Optionally, the fourth indication information may be used to distinguish between TDD and FDD. That is, the fourth indication information may include two portions: one portion for indicating that or whether the UE supports transmitting a PHR after Msg3 for a TDD system; the other portion for indicating that or whether the UE supports transmitting a PHR after Msg3 for an FDD system.

UE-Side Embodiment 10

This embodiment provides a method for activating/deactivating transmission of a PHR after Msg3.

Step 1: UE receives an activation/deactivation indication for transmission of a PHR after Msg3.

Step 2: if the activation/deactivation indication for transmission of a PHR after Msg3 is activation, then the UE activates a PHR transmission procedure after Msg3; if the activation/deactivation indication for transmission of a PHR after Msg3 is deactivation, then the UE deactivates a PHR transmission procedure after Msg3, including discarding transmission of a waiting PHR. The PHR transmission procedure after Msg3 is used to transmit PHR information after Msg3.

Preferably, the activation/deactivation indication for transmission of a PHR after Msg3 is a MAC CE; alternatively, the activation/deactivation indication for transmission of a PHR after Msg3 is Layer 1 signaling, for example, included in a Physical Downlink Control Channel (PDCCH).

If the activation/deactivation indication for transmission of a PHR after Msg3 is a MAC CE, then this embodiment may be described as:

For each transmission time interval (TTI), a MAC entity will:
activate a PHR procedure if the MAC entity receives a PHR activation/deactivation MAC CE in this TTI to activate a PHR; and
deactivate a PHR procedure if the MAC entity receives a PHR activation/deactivation MAC CE in this TTI to deactivate a PHR.

If the PHR procedure is deactivated, then the UE performs one or a plurality of the following operations:
skipping transmission of any PHR;
skipping triggering of any PHR; and
discarding a PHR waiting to be transmitted.

An initial state of the PHR transmitted after Msg3 is predefined, that is, the initial state thereof is predefined as deactivated (or activated). Alternatively, the initial state of the PHR is configured through an RRC message.

Optionally, a PHR deactivation timer is defined. When the UE or UE MAC entity receives a PHR activation/deactivation MAC CE for activating a PHR or receives an RRC message including a PHR configuration, the PHR timer is initiated or reinitiated; when the PHR timer expires, the PHR is deactivated or it is considered that the PHR is deactivated. Optionally, the method further includes stopping the timer.

UE-Side Embodiment 11

This embodiment provides a format of a PHR transmitted after Msg3.

Figure 10:
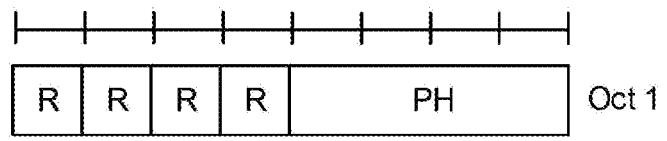
FIG. 10 schematically shows a format of a PHR transmitted after Msg3 according to an exemplary embodiment of the present disclosure.

A format example of the PHR transmitted after Msg3 is shown in FIG. 10, where the PHR transmitted after Msg3 has a fixed length of 1 byte. A PH field occupies 3 bits, and the remaining bits are reserved bits; or the PH field is of 4 bits, and the remaining bits are reserved bits; or the PH field is of 5 bits, and the remaining bits are reserved bits. The reserved bits are set to 0.

To be distinguished from other MAC CEs, the PHR has a corresponding MAC subheader. In the MAC subheader corresponding to the PHR, preferably, the value of an LCID thereof is one of reserved LCIDs, for example, "10011" or "10010"; alternatively, the value of the LCID thereof may be a reused LCID value "11010" corresponding to a PHR in an LTE system.

Mechanism of PHR Transmission Requested by UE—UE Side

In this section, PHRs include PHRs transmitted after Msg3. The following embodiments in this section provide a method for PHR transmission requested by UE. The PHR transmission requested by UE may also be described as a PHR request or PHR transmission request or a PHR requested by the UE. Preferably, the request is used for requesting a plurality of PHR transmissions; alternatively, the request is used for requesting one PHR transmission.

The PHR may be replaced with the "BSR" or "PHR and BSR" or the "BPR" described above.

UE-Side Embodiment 12

This embodiment provides a method related to a PHR transmission request, including the following steps:

Step 1: if UE supports a PHR transmission request and a base station allows a PHR transmission request, then the UE transmits a PHR transmission request to the base station;

Step 2: the UE receives a PHR transmission grant from the base station; and

Step 3: the UE transmits a PHR; This step is optional.

The PHR transmission request transmitted by the UE in step 1 may be included in RRC signaling, or may be included in a MAC CE, or may be included in Layer 1 signaling. Furthermore, a plurality of manners are provided below.

In one implementation, the PHR transmission request is included in a DPR. If a PHR transmission request bit in the DPR is set to "1," then it is indicated that the UE requests PHR transmission; if the bit is set to "0," then it is indicated that the UE does not request PHR transmission.

Figure 11:
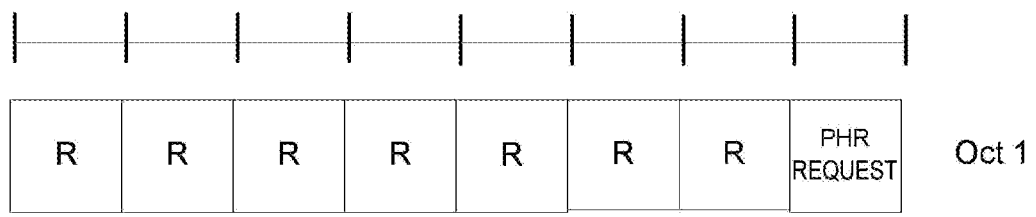
FIG. 11 schematically shows a format of a PHR transmission request MAC CE according to an exemplary embodiment of the present disclosure.

In one implementation, the PHR transmission request is a separate MAC CE, a format example of which is shown in FIG. 11. The MAC CE is referred to as a PHR transmission request MAC CE, which has a corresponding MAC subheader and an associated LCID.

In one implementation, the PHR transmission request is included in an RRC connection request message, or an RRC connection establishment complete message, or an RRC connection reestablishment complete or an RRC connection reconfiguration complete, or an RRC connection resume complete. If a PHR transmission request information element in the RRC message is set to "True" or "1" or "required," then it is indicated that the UE requests PHR transmission; if the PHR transmission request information element in the RRC message is set to "False" or "0" or "not required" or does not exist, then it is indicated that the UE does not request PHR transmission.

The UE requesting PHR transmission may also be expressed as that the PHR is available or that (whether) PHR transmission is required or that (whether) the UE requests PHR transmission.

For an example in which the base station allows a PHR transmission request in step 1, please refer to UE-side Embodiment 13 that will be described later. With reference to UE-side Embodiment 13, step 1 may be described as: if (the UE supports a PHR transmission request and) fifth indication information is included in an RRC message or the fifth indication information indicates allowing a PHR transmission request, then the UE transmits a PHR transmission request to the base station. The UE transmitting a PHR transmission request to the base station may also be described as: setting the PHR transmission request information element or bit to "1" or "TRUE"; or described as: instructing a multiplexing and assembly process to generate a PHR transmission request MAC CE.

In step 2, the PHR transmission grant is included in an RRC message, or in a MAC CE, or in Layer 1 signaling.

If the PHR transmission grant is included in an RRC message, then preferably, the PHR transmission grant is a PHR transmission grant indication information element included in a PHR configuration information element; if the PHR transmission grant indication information element is set to "True" or "1" or "setup," then it is indicated that PHR transmission is allowed or enabled; if the PHR transmission request information element in the RRC message is set to "False" or "0" or does not exist, then it is indicated that PHR transmission is not allowed or is deactivated or prohibited.

If the PHR transmission grant is included in an RRC message, then alternatively, the PHR transmission grant is a PHR configuration that includes one or a plurality of a periodic PHR timer configuration, a prohibit PHR timer configuration, a downlink path loss change configuration, and so on. If the PHR configuration is included in an RRC message, then it is indicated that PHR transmission is allowed or enabled; if the PHR configuration is not included in an RRC message or the PHR configuration is "release," then it is indicated that PHR transmission is not allowed or is deactivated or prohibited.

If the PHR transmission grant is included in a MAC CE: if a PHR transmission grant bit is set to "1," then it is indicated that PHR transmission is allowed or enabled; if the PHR transmission grant bit is set to "0," then it is indicated that the UE does not allow or deactivates or prohibits PHR transmission. Alternatively, the MAC CE including the PHR transmission grant may be used only for the PHR transmission grant and is referred to as a PHR transmission grant MAC CE, which has a corresponding MAC subheader and a corresponding LCID.

If the PHR transmission grant is included in Layer 1 signaling, then preferably, the Layer 1 signaling may be carried in DCI of a PDCCH. If the PHR transmission grant bit is set to "1," then it is indicated that PHR transmission is allowed or enabled; if the PHR transmission grant bit is set to "0," then it is indicated that the UE does not allow or deactivates or prohibits PHR transmission.

In step 3, if it is configured in step 2 that the PHR configuration or PHR transmission is allowed or enabled, then the UE initiates a PHR process. The initiating a PHR process may also be described as activating the PHR process or enabling the PHR process. Optionally, the initiating a PHR process includes initiating a relevant timer, and triggering or reporting a PHR.

UE-Side Embodiment 13

This embodiment provides a method used by UE to acquire whether a base station allows a PHR transmission request. The term "allow" may be replaced with "support," "enable," or "activate," and the term "not support" or "not allow" may be replaced with "disable" or "deactivate."

In one implementation, the UE receives fifth indication information from the base station, where the fifth indication information is used for indicating that (whether) the cell allows a PHR transmission request. Preferably, if the fifth indication information exists, then the cell allows a PHR transmission request; if the indication information does not exist, then the cell does not allow a PHR transmission request. Alternatively, if the indication information is set to "TRUE" or "1," then the cell allows a PHR transmission request; if the indication information is set to "FALSE" or "0," then the cell does not allow a PHR transmission request. Optionally, the fifth indication information is included in system information such as a system information block 1 or system information block 2. Alternatively, the fifth indication information is included in a dedicated RRC message such as an RRC connection reconfiguration message or an RRC connection establishment message or an RRC connection reestablishment message or an RRC connection resume message, and in particular, included in a MAC-mainconfig information element in the RRC message. Alternatively, the fifth indication information is included in a MAC CE that has a corresponding MAC subheader and a corresponding LCID.

In one implementation, the UE receives an RRC message from the base station, and if the RRC message includes an RRC information element specific to Release 15 or subsequent releases, then the UE considers that the base station is a base station of Release 15 or a base station of a release subsequent to Release 15. That is, the UE considers that the base station allows a PHR transmission request. Otherwise, if the RRC message does not include an RRC information element specific to Release 15 or subsequent releases, then the UE considers that the base station is a base station of Release 14 or a base station of a release preceding Release 14. That is, the UE considers that the base station does not allow a PHR transmission request. Preferably, the RRC message is system information. In this implementation, it is considered that all base stations of Release 15 and base stations of subsequent releases support a PHR transmission request.

UE-Side Embodiment 14

This embodiment provides a method for reporting a capability as to whether UE supports a PHR transmission request. The method is performed at UE, and in particular NB-IoT UE.

Step 1: the UE receives a UE capability enquiry (UECapabilityEnquiry) message from a base station, where the message is used for requesting transfer of UE radio access capabilities. The UE radio access capabilities include E-UTRA radio access capabilities and radio access capabilities of other radio access technologies.

Step 2: the UE transmits a UE capability information (UECapabilityInformation) message to the base station, where the message includes sixth indication information for indicating that or whether the UE supports a PHR transmission request. Furthermore, if the sixth indication information is set to "supported," then it is indicated that the UE supports a PHR transmission request; if the indication information does not exist, then it is indicated that the UE does not support a PHR transmission request.

Optionally, the sixth indication information may be used to distinguish between TDD and FDD. That is, the sixth indication information may include two portions: one portion for indicating that or whether the UE supports a PHR transmission request for a TDD system; the other portion for indicating that or whether the UE supports a PHR transmission request for an FDD system.

Figure 12:
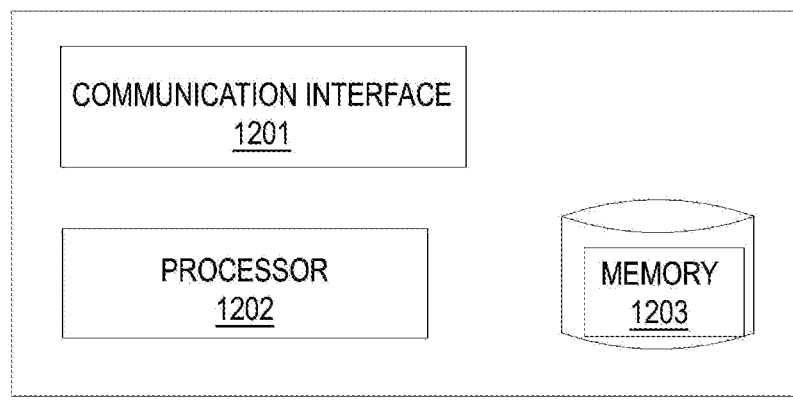
FIG. 12 schematically shows a structural block diagram of UE according to an exemplary embodiment of the present invention.

The structure of UE according to an exemplary embodiment of the present invention will be described below with reference to FIG. 12. FIG. 12 schematically shows a structural block diagram of UE according to an exemplary embodiment of the present invention. The UE 1100 may be used for respectively performing the methods 500 and 600 described with reference to FIGS. 5 and 6 and the methods described in Additional Embodiments 1 to 8. For the sake of simplicity, only a schematic structure of the UE according to the exemplary embodiment of the present disclosure is described herein, and details already described in the methods 500 and 600 described before with reference to FIGS. 5 and 6 and the methods described in the aforementioned additional embodiments are omitted.

As shown in FIG. 12, the UE 1200 includes a communication interface 1201 configured to perform external communication; a processing unit or a processor 1202, where the processor 1202 may be a single unit or a combination of a plurality of units configured to perform different steps of the method; and a memory 1203 storing computer-executable instructions.

In the embodiment in which the UE 1200 is used for performing the method 500, when executed by the processor 1202, the instructions cause the processor 1202 to perform the following process:

receiving system information from a base station, where the system information includes indication information for indicating that or whether the base station supports a DPR; and determining, according to capability information for indicating that the UE supports an extended DPR and the received indication information for indicating that the base station supports an extended DPR, to transmit an extended DPR to the base station in Msg3.

In one exemplary embodiment, the extended DPR is identified by a logical channel identity (LCID) in a medium access control (MAC) subheader used for a common control channel (CCCH) service data unit (SDU) or a separately set medium access control (MAC) subheader; the value of the LCID is selected from reserved LCID values or is a reused LCID value used for identifying other MAC Ces.

In one exemplary embodiment, it is determined, according to the capability information for indicating that the UE supports an extended DPR and the received indication information for indicating that the base station supports an extended DPR, to transmit the extended DPR to the base station in Msg3 when at least one of the following conditions is satisfied:

the amount of data to be transmitted by the UE exceeds a first predetermined threshold;

a coverage enhancement level of the UE does not exceed a second predetermined threshold; and an electric quantity of the UE does not exceed a third predetermined threshold.

The first, second, and third predetermined thresholds are predefined by a system or acquired from a radio resource control (RRC) message transmitted by the base station.

In the embodiment in which the UE 1200 is used for performing the method 600, when executed by the processor 1202, the instructions cause the processor 1202 to perform the following process:

receiving, from a base station, a UE capability enquiry message for requesting transfer of UE radio access capabilities; and transmitting a UE capability information message to the base station, where the UE capability information message includes indication information for indicating that or whether the UE supports an extended data volume and power headroom report (DPR).

A method performed at a base station for receiving an extended DPR according to an exemplary embodiment of the present disclosure will be described below with reference to FIG. 13.

Figure 13:
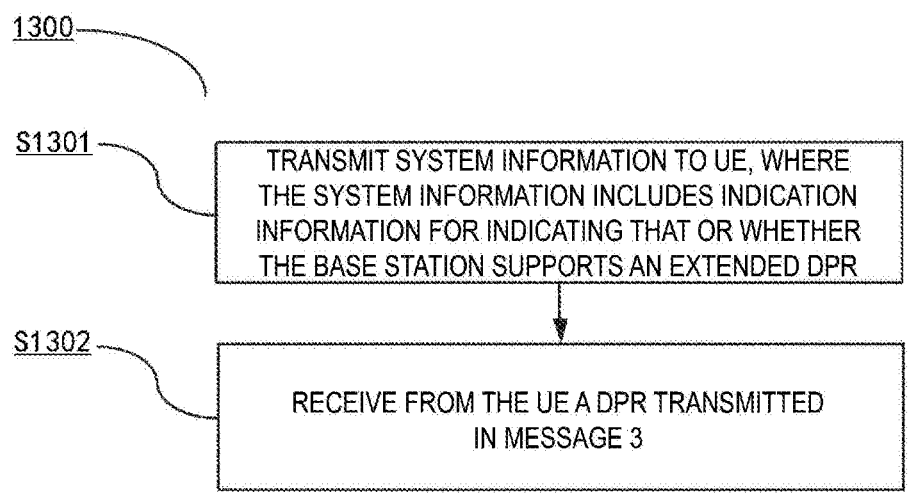
FIG. 13 schematically shows a flowchart of a method performed at a base station for receiving an extended DPR according to an exemplary embodiment of the present disclosure.

FIG. 13 shows a flowchart of a method 1300 performed at a base station for receiving an extended DPR according to an exemplary embodiment of the present disclosure. As shown in FIG. 13, the method 1300 may include steps S1301 and S1302.

In step S1301, the base station transmits system information to UE, where the system information includes indication information (namely, the aforementioned first indication information) for indicating that or whether the base station supports an extended DPR.

In one implementation, the base station transmits the first indication information to the UE, where the first indication information can indicate that or whether a cell served by the base station allows an extended DPR or allows transmitting an extended DPR. Preferably, if the first indication information is present, then the cell allows an extended DPR or allows transmitting an extended DPR; if the first indication information is not present, then the cell does not allow an extended DPR or does not allow transmitting an extended DPR. Alternatively, if the first indication information is set to "TRUE" or "1," then the cell allows an extended DPR or allows transmitting an extended DPR; if the first indication information is set to "FALSE" or "0," then the cell does not allow an extended DPR or does not allow transmitting an extended DPR. Preferably, the first indication information is included in the system information such as a system information block 1 or system information block 2, and the system information can be carried in an RRC message.

In another implementation of S1301, the base station transmits an RRC message to the UE, and if the RRC message includes an RRC information element specific to Release 15 or subsequent releases, then the base station is a base station of Release 15 or a base station of a release subsequent to Release 15. That is, the base station allows an extended DPR or allows transmitting an extended DRP or supports an extended DPR. Otherwise, if the RRC message does not include an RRC information element specific to Release 15 or subsequent releases, then the base station is a base station of Release 14 or a base station of a release preceding Release 14. That is, the base station does not allow an extended DPR or does not allow transmitting an extended DRP or does not support an extended DPR. Preferably, the RRC message is system information. In this implementation, it is considered that all base stations of Release 15 and base stations of subsequent releases support or allow an extended DPR.

In Step S1302, the base station may receive from the UE a DPR transmitted in Msg3.

The method 1300 may further include the following step (not shown): determining whether the received DPR is an extended DPR or a conventional DPR by detecting the value of an LCID in a MAC subheader used for a CCCH SDU or a separately set MAC subheader, where it is determined that the received DPR is an extended DPR if it is detected that the LCID value is a reserved LCID value or a reused LCID value used for identifying other MAC Ces.

In another implementation, the base station may transmit, in an RRC message, to the UE configuration information including a threshold related to a predetermined condition. The RRC message may be a dedicated RRC message, such as an RRC connection reconfiguration message or system information.

As described before, the predetermined condition threshold may be used by the UE for determining the type of the DPR to be transmitted.

Although the complete process of receiving an extended DPR at a base station is described above, the embodiment of the present disclosure not only includes the aforementioned complete process, but also includes separate implementations related to an extended DPR described in the following embodiments.

Base Station-Side Embodiment 1

This embodiment provides a method for distinguishing between a conventional DPR and an extended DPR. Through this embodiment, the base station can distinguish between a conventional DRP and an extended DPR when receiving a DPR so as to perform correct decoding/parsing.

In this embodiment, like a conventional DPR, an extended DPR is identified by a MAC subheader used for a CCCH SDU without any additional MAC subheader added, and is always placed before the CCCH SDU. Unlike the conventional DPR, an LCID for identifying the extended DPR in the MAC subheader used for a CCCH SDU is a new LCID value that is selected from reserved LCID values 01101 to 10011, for example, "01101." Alternatively, the LCID value may also be a reused LCID value corresponding to other MAC Ces in an LTE system, for example, a reused LCID "11110" of a long BSR, or a reused LCID "11101" of a short BSR, or a reused LCID "11100" of a truncated BSR, or a reused LCID "11010" of a PHR, or a reused LCID "11001" of an extended PHR, or a reused LCID "11000" of a dual connectivity PHR. Since the aforementioned MAC Ces corresponding to reused LCIDs and the extended DPR do not appear in msg3 at the same time, reuse of LCIDs corresponding to the MAC Ces does not cause confusion.

For the base station, if the LCID in the subheader corresponding to the CCCH SDU is "00000," then the DPR before the CCCH SDU is a conventional DPR; otherwise, the DPR before the CCCH SDU is an extended DPR.

Base Station-Side Embodiment 2

This embodiment provides another method for distinguishing between a conventional DPR and an extended DPR.

In this embodiment, unlike a conventional DPR, an extended DPR corresponds to a MAC subheader. That is, the MAC subheader corresponding to the extended DPR is not shared with any CCCH SDU or other MAC SDUs/Ces. The extended DPR is identified by an LCID in the corresponding MAC subheader thereof. For example, preferably, the LCID may be a new value "10011." Alternatively, the LCID value may also be a reused LCID value corresponding to other MAC Ces in an LTE system, for example, a reused LCID "11110" of a long BSR, or a reused LCID "11101" of a short BSR, or a reused LCID "11100" of a truncated BSR, or a reused LCID "11010" of a PHR, or a reused LCID "11001" of an extended PHR, or a reused LCID "11000" of a dual connectivity PHR. Since the aforementioned MAC Ces corresponding to reused LCIDs and the extended DPR do not appear in msg3 at the same time, reuse of LCIDs corresponding to the MAC Ces does not cause confusion.

For the extended DPR, the location thereof in the MAC PDU may be any location before a MAC SDU and after a MAC header, that is, not limited to being only before the CCCH SDU.

Base Station-Side Embodiment 3

This embodiment provides a method for determining the type of a DPR to be transmitted in Msg3. In accordance with UE-side Embodiment 4, a manner of configuring a predetermined condition is provided. The DPR type includes a conventional DPR and an extended DPR.

The base station delivers to the UE configuration information including a threshold related to a predetermined condition. Furthermore, the RRC message may be a dedicated RRC message, such as an RRC connection reconfiguration message or system information.

As described in UE-side Embodiment 4, the predetermined condition threshold is used by the UE for determining the type of the DPR to be transmitted.

In one implementation, the predetermined condition threshold is a data volume value, referred to as a first predetermined threshold. The predetermined condition is that or whether more data needs to be transmitted or that or whether the amount of data to be transmitted exceeds a first predetermined threshold. The predetermined condition being satisfied means that more data needs to be transmitted, or the amount of data to be transmitted is greater than or greater than or equal to the first predetermined threshold. The predetermined condition being not satisfied means that no more data needs to be transmitted or the amount of data to be transmitted is less than or less than or equal to the first predetermined threshold.

In another implementation, the predetermined condition may also be that or whether a coverage enhancement level of the UE does not exceed the second predetermined threshold. The predetermined condition being satisfied means that the coverage enhancement level of the UE does not exceed the second predetermined threshold; the predetermined condition being not satisfied means that the coverage enhancement level of the UE exceeds the second predetermined threshold. In another implementation, the predetermined condition may also be that or whether a coverage enhancement level of the UE is not lower than the second predetermined threshold. The predetermined condition being satisfied means that the coverage enhancement level of the UE is not lower than the second predetermined threshold; the predetermined condition being not satisfied means that the coverage enhancement level of the UE is lower than the second predetermined threshold.

In a further implementation, the predetermined condition threshold is an electric quantity value, referred to as a third predetermined threshold. The predetermined condition is that or whether an electric quantity of the UE is a low electric quantity or that or whether the electric quantity of the UE is lower than a third predetermined threshold. The predetermined condition being satisfied means that the electric quantity of the UE is a low electric quantity or the electric quantity of the UE is less than or less than or equal to the third predetermined threshold. The predetermined condition being not satisfied means that the electric quantity of the UE is not a low electric quantity, or the electric quantity of the UE is greater than or greater than or equal to the third predetermined threshold. The electric quantity of the UE may refer to a battery level of the UE.

Base Station-Side Embodiment 4

This embodiment provides a method used by a base station to notify information for indicating that or whether UE supports an extended DPR. The terms "support" and "allow" can be replaced with each other.

In one implementation, the base station transmits the first indication information to the UE, where the indication information is used for indicating that or whether the cell allows an extended DPR or allows transmitting an extended DPR. Preferably, if the indication information is present, then the cell allows an extended DPR or allows transmitting an extended DPR; if the indication information is not present, then the cell does not allow an extended DPR or does not allow transmitting an extended DPR. Alternatively, if the indication information is set to "TRUE" or "1," then the cell allows an extended DPR or allows transmitting an extended DPR; if the indication information is set to "FALSE" or "0," then the cell does not allow an extended DPR or does not allow transmitting an extended DPR. Preferably, the indication information is included in system information such as a system information block 1 or system information block 2.

In one implementation, the base station transmits an RRC message to the UE; if the RRC message includes an RRC information element specific to Release 15 or subsequent releases, then the base station is a base station of Release 15 or a base station of a release subsequent to Release 15. That is, the base station allows an extended DPR or allows transmitting an extended DRP or supports an extended DPR. Otherwise, if the RRC message does not include an RRC information element specific to Release 15 or subsequent releases, then the base station is a base station of Release 14 or a base station of a release preceding Release 14. That is, the base station does not allow an extended DPR or does not allow transmitting an extended DRP or does not support an extended DPR. Preferably, the RRC message is system information. In this implementation, it is considered that all base stations of Release 15 and base stations of subsequent releases support or allow an extended DPR.

A method performed at a base station for acquiring a capability of UE as to that or whether an extended DPR is supported according to an exemplary embodiment of the present disclosure will be described below with reference to FIG. 14.

Figure 14:
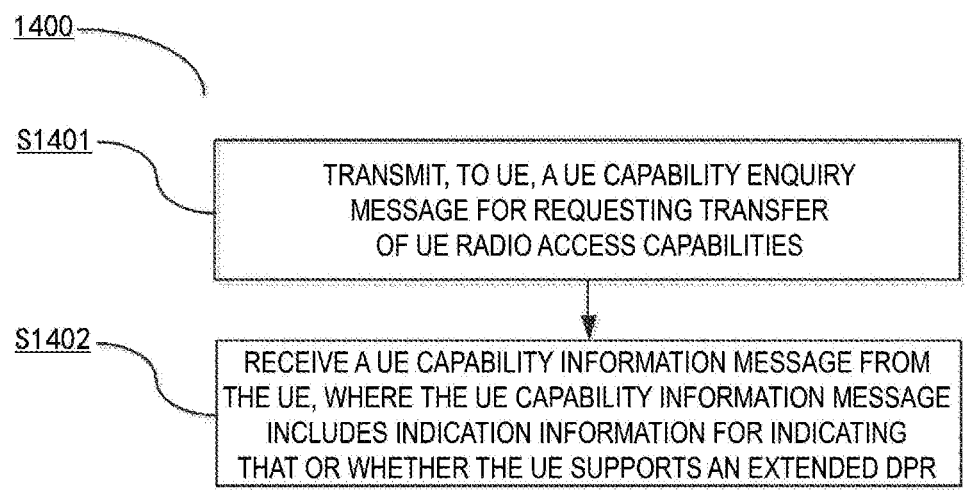
FIG. 14 schematically shows a flowchart of a method performed at a base station for requesting UE to report a capability as to whether an extended DPR is supported according to an exemplary embodiment of the present disclosure.

FIG. 14 schematically shows a flowchart of a method 1400 performed at a base station for acquiring a capability of UE as to that or whether an extended DPR is supported according to an exemplary embodiment of the present disclosure. As shown in FIG. 14, the method 1400 may include steps S1401 and S1402.

In step S1401, the base station may transmit to UE a UE capability enquiry message for requesting transfer of UE radio access capabilities; and in step S1402, the base station may receive a UE capability information message from the UE, where the UE capability information message includes indication information (hereinafter referred to as second indication information to avoid confusion) for indicating that or whether the UE supports a DPR. In one example, if the second indication information is set to "supported," then it is indicated that the UE supports an extended DPR; if the second indication information does not exist, then it is indicated that the UE does not support an extended DPR.

Optionally, the second indication information may be used to distinguish between a time division duplex (TDD) system and a frequency division duplex (FDD) system. That is, the second indication information may include two portions: one portion for indicating that or whether the UE supports an extended DPR for the TDD system; the other portion for indicating that or whether the UE supports an extended DPR for the FDD system.

Other exemplary embodiments of the present disclosure performed at the base station side will be described below.

Mechanism of PHR Transmitted after Msg3—Base Station Side

In the present disclosure, a PHR transmitted after Msg3 may also be described as the following: a PHR after Msg3, or a PHR not in Msg3, or a PHR not transmitted together with Msg3, or PHR MAC CE transmission.

Base Station-Side Embodiment 5

This embodiment provides a method used by a base station to notify UE that or whether the base station supports transmitting a PHR after Msg3. In one implementation, the base station transmits third indication information to the UE, where the third indication information is used for indicating that (whether) the cell allows transmitting a PHR after Msg3. Alternatively, the indication information is used for indicating that (whether) the cell supports transmitting a PHR after Msg3. Preferably, if the third indication information exists, then the cell allows transmitting a PHR after Msg3 or the cell supports transmitting a PHR after Msg3; if the indication information does not exist, then the cell does not allow transmitting a PHR after Msg3 or the cell does not support transmitting a PHR after Msg3. Alternatively, if the indication information is set to "TRUE" or "1," then the cell allows transmitting a PHR after Msg3 or the cell supports transmitting a PHR after Msg3; if the indication information is set to "FALSE" or "0," then the cell does not allow transmitting a PHR after Msg3 or the cell does not support transmitting a PHR after Msg3. Preferably, the third indication information is included in system information such as a system information block 1 or system information block 2. Alternatively, the third indication information is included in a dedicated RRC message such as an RRC connection reconfiguration message, or an RRC connection establishment message, or an RRC connection reestablishment message, or an RRC connection resume message, and in particular, included in a MAC-mainconfig information element in the RRC message.

In one implementation, the base station transmits an RRC message to the UE; if the RRC message includes an RRC information element specific to Release 15 or subsequent releases, then the base station is a base station of Release 15 or a base station of a release subsequent to Release 15. That is, the base station allows transmitting a PHR after Msg3 or supports transmitting a PHR after Msg3. Otherwise, if the RRC message does not include an RRC information element specific to Release 15 or subsequent releases, then the base station is a base station of Release 14 or a base station of a release preceding Release 14. That is, the base station does not allow transmitting a PHR after Msg3 or does not support transmitting a PHR after Msg3. Preferably, the RRC message is system information. In this implementation, it is considered that all base stations of Release 15 and base stations of subsequent releases support or allow transmitting a PHR after Msg3.

Base Station-Side Embodiment 6

This embodiment provides a method used by a base station to acquire a capability as to whether UE supports transmitting a PHR after Msg3.

Step 1: the base station transmits a UE capability enquiry (UECapabilityEnquiry) message to the UE, where the message is used for requesting transfer of UE radio access capabilities. The UE radio access capabilities include E-UTRA radio access capabilities and radio access capabilities of other radio access technologies.

Step 2: the base station receives a UE capability information (UECapabilityInformation) message from the UE, where the message includes fourth indication information for indicating that or whether the UE supports transmitting a PHR after Msg3. Furthermore, if the fourth indication information is set to "supported," then it is indicated that the UE supports transmitting a PHR after Msg3; if the indication information does not exist, then it is indicated that the UE does not support transmitting a PHR after Msg3.

Optionally, the fourth indication information may be used to distinguish between TDD and FDD. That is, the fourth indication information may include two portions: one portion for indicating that or whether the UE supports transmitting a PHR after Msg3 for a TDD system; the other portion for indicating that or whether the UE supports transmitting a PHR after Msg3 for an FDD system.

Base Station-Side Embodiment 7

This embodiment provides a method for activating/deactivating transmission of a PHR after Msg3.

Step 1: a base station transmits an activation/deactivation indication for transmission of a PHR after Msg3.

Step 2: a PHR is received if an activation/deactivation indication for transmission of a PHR after Msg3 is activation.

Preferably, the activation/deactivation indication for transmission of a PHR after Msg3 is a MAC CE; alternatively, the activation/deactivation indication for transmission of a PHR after Msg3 is Layer 1 signaling, for example, included in a PDCCH.

An initial state of the PHR transmitted after Msg3 is predefined, that is, the initial state thereof is predefined as deactivated (or activated). Alternatively, the initial state of the PHR is configured through an RRC message.

Optionally, a PHR deactivation timer is defined. The base station configures for the UE the value of the PHR deactivation timer through an RRC message.

Mechanism of PHR Transmission Requested by UE—Base Station Side

In this section, the PHRs include PHRs transmitted after Msg3. The following embodiments in this section provide a method for PHR transmission requested by UE. The PHR transmission requested by UE may also be described as a PHR request or a PHR transmission request or a PHR requested by the UE. Preferably, the request is used for requesting a plurality of PHR transmissions; alternatively, the request is used for requesting one PHR transmission.

The PHR may be replaced with the "BSR" or "PHR and BSR" or the "BPR" described above.

Base Station-Side Embodiment 8

This embodiment provides a method related to a PHR transmission request, including the following steps:

Step 1: a base station receives a PHR transmission request transmitted by UE;

Step 2: transmit a PHR transmission grant to the UE; and

Step 3: receive a PHR transmitted by the UE. This step is optional.

The PHR transmission request transmitted by the UE in step 1 may be included in RRC signaling, or in a MAC CE, or in Layer 1 signaling. Furthermore, a plurality of manners is provided below.

In one implementation, the PHR transmission request is included in a DPR. If a PHR transmission request bit in the DPR is set to "1," then it is indicated that the UE requests PHR transmission; if the bit is set to "0," then it is indicated that the UE does not request PHR transmission.

In one implementation, the PHR transmission request is a separate MAC CE, a format example of which is shown in FIG. 9. The MAC CE is referred to as a PHR transmission request MAC CE, which has a corresponding MAC subheader and an associated LCID.

In one implementation, the PHR transmission request is included in an RRC connection request message, or an RRC connection establishment complete message, or an RRC connection reestablishment complete, or an RRC connection reconfiguration complete or an RRC connection resume complete. If a PHR transmission request information element in the RRC message is set to "True" or "1" or "required," then it is indicated that the UE requests PHR transmission; if the PHR transmission request information element in the RRC message is set to "False" or "0" or "not required" or does not exist, then it is indicated that the UE does not request PHR transmission.

The UE requesting PHR transmission may also be expressed as that the PHR is available or that (whether) PHR transmission is required or that (whether) the UE requests PHR transmission.

In step 2, the PHR transmission grant is included in an RRC message, or included in a MAC CE, or included in Layer 1 signaling.

If the PHR transmission grant is included in an RRC message, then preferably, the PHR transmission grant is a PHR transmission grant indication information element included in a PHR configuration information element; if the PHR transmission grant indication information element is set to "True" or "1" or "setup," then it is indicated that PHR transmission is allowed or enabled; if the PHR transmission request information element in the RRC message is set to "False" or "0" or does not exist, then it is indicated that PHR transmission is not allowed or is deactivated or prohibited.

If the PHR transmission grant is included in an RRC message, then alternatively, the PHR transmission grant is PHR configuration that includes one or a plurality of a periodic PHR timer configuration, a prohibit PHR timer configuration, a downlink path loss change configuration, and so on. If the PHR configuration is included in an RRC message, then it is indicated that PHR transmission is allowed or enabled; if the PHR configuration is not included in an RRC message or the PHR configuration is "release," then it is indicated that PHR transmission is not allowed or is disabled or prohibited.

If the PHR transmission grant is included in a MAC CE: if a PHR transmission grant bit is set to "1," then it is indicated that PHR transmission is allowed or enabled; if the PHR transmission grant bit is set to "0," then it is indicated that the UE does not allow or deactivates or prohibits PHR transmission. Alternatively, the MAC CE including the PHR transmission grant may be used only for the PHR transmission grant and is referred to as a PHR transmission grant MAC CE, which has a corresponding MAC subheader and a corresponding LCID.

If the PHR transmission grant is included in Layer 1 signaling, then preferably, the Layer 1 signaling may be carried in DCI of a PDCCH. If the PHR transmission grant bit is set to "1," then it is indicated that PHR transmission is allowed or enabled; if the PHR transmission grant bit is set to "0," then it is indicated that the UE does not allow or deactivates or prohibits PHR transmission.

Base Station-Side Embodiment 9

This embodiment provides a method used by a base station to notify UE whether the base station allows a PHR transmission request. The term "allow" may be replaced with "support," "enable," or "activate," and the term "not support" or "not allow" may be replaced with "disable" or "deactivate."

In one implementation, the base station transmits fifth indication information to the UE, where the fifth indication information is used for indicating that (whether) the cell allows a PHR transmission request. Preferably, if the fifth indication information exists, then the cell allows a PHR transmission request; if the indication information does not exist, then the cell does not allow a PHR transmission request. Alternatively, if the indication information is set to "TRUE" or "1," then the cell allows a PHR transmission request; if the indication information is set to "FALSE" or "0," then the cell does not allow a PHR transmission request. Optionally, the fifth indication information is included in system information such as a system information block 1 or system information block 2. Alternatively, the fifth indication information is included in a dedicated RRC message such as an RRC connection reconfiguration message, or an RRC connection establishment message, or an RRC connection reestablishment message, or an RRC connection resume message, and in particular, included in a MAC-mainconfig information element in the RRC message. Alternatively, the fifth indication information is included in a MAC CE that has a corresponding MAC subheader and a corresponding LCID.

In one implementation, the base station transmits an RRC message to the UE; if the RRC message includes an RRC information element specific to Release 15 or subsequent releases, then the base station is a base station of Release 15 or a base station of a release subsequent to Release 15. That is, the base station allows a PHR transmission request. Otherwise, if the RRC message does not include an RRC information element specific to Release 15 or subsequent releases, then the base station is a base station of Release 14 or a base station of a release preceding Release 14. That is, the base station does not allow a PHR transmission request. Preferably, the RRC message is system information. In this implementation, it is considered that all base stations of Release 15 and base stations of subsequent releases support a PHR transmission request.

Base Station-Side Embodiment 10

This embodiment provides a method used by a base station to acquire a capability as to whether UE supports a PHR transmission request.

Step 1: the base station transmits a UE capability enquiry (UECapabilityEnquiry) message to the UE, where the message is used for requesting transfer of UE radio access capabilities. The UE radio access capabilities include E-UTRA radio access capabilities and radio access capabilities of other radio access technologies.

Step 2: the base station receives a UE capability information (UECapabilityInformation) message from the UE, where the message includes sixth indication information for indicating whether the UE supports a PHR transmission request. Furthermore, if the sixth indication information is set to "supported," then it is indicated that the UE supports a PHR transmission request; if the indication information does not exist, then it is indicated that the UE does not support a PHR transmission request.

Optionally, the sixth indication information may be used to distinguish between TDD and FDD. That is, the sixth indication information may include two portions: one portion for indicating that or whether the UE supports a PHR transmission request for a TDD system; the other portion for indicating that or whether the UE supports a PHR transmission request for an FDD system.

In an exemplary embodiment of the present disclosure, a plurality of arbitrary pieces of the following indication information may be jointly indicated:
 the first indication information for indicating that or whether the cell allows an extended DPR;
 the third indication information for indicating that or whether the cell supports transmitting a PHR after Msg3; and
 the fifth indication information for indicating that or whether the cell allows a PHR transmission request.

The joint indication means that a single indication may be used to represent the plurality of arbitrary pieces of indication information above. For example, a single indication may be used to indicate both the first indication information and the third indication information. In this case, when the single indication is set to "1" or "True," it is indicated that the cell allows an extended DPR and allows transmitting a PHR after Msg3.

In the present disclosure, a plurality of arbitrary pieces of the following indication information may be jointly indicated:
 the second indication information for indicating that or whether the UE supports an extended DPR;
 the fourth indication information for indicating that or whether the UE supports transmitting a PHR after Msg3; and the sixth indication information for indicating that or whether the UE supports a PHR transmission request.

The joint indication means that a single indication may be used to represent the plurality of arbitrary pieces of indication information above. For example, a single indication may be used to indicate both the second indication information and the fourth indication information. In this case, when the single indication is set to "supported," it is indicated that the UE supports an extended DPR and transmitting a PHR after Msg3.

Figure 15:
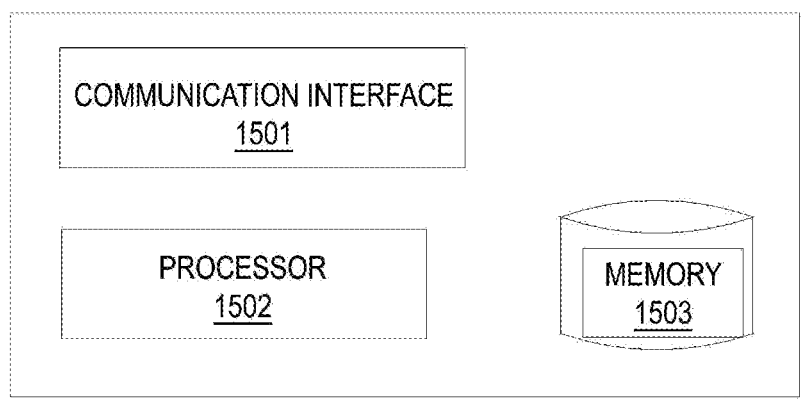
FIG. 15 schematically shows a structural block diagram of a base station according to an exemplary embodiment of the present invention.

The structure of a base station according to an exemplary embodiment of the present invention will be described below with reference to FIG. 15. FIG. 15 schematically shows a structural block diagram of a base station according to an exemplary embodiment of the present invention. The base station 1500 may be used for respectively performing the methods 1300 and 1400 described with reference to FIGS. 13 and 14 and the methods described in Additional Embodiments 9 to 14. For the sake of simplicity, only a schematic structure of the base station according to the exemplary embodiment of the present disclosure is described herein, and details already described in the methods 1300 and 1400 described before with reference to FIGS. 13 and 14 and the methods described in the aforementioned additional embodiments are omitted.

As shown in FIG. 15, the base station 1500 includes a communication interface 1501 configured to perform external communication; a processing unit or a processor 1502, where the processor 1502 may be a single unit or a combination of a plurality of units configured to perform different steps of the method; and a memory 1503 storing computer-executable instructions.

In the embodiment in which the base station 1500 is used for performing the method 1300, when executed by the processor 1502, the instructions cause the processor 1502 to perform the following process:

transmitting system information to UE, where the system information includes indication information for indicating that or whether the base station supports an extended data volume and power headroom report (DPR); and receiving from the UE a DPR transmitted in Msg3.

In one exemplary embodiment, when executed by the processor 1502, the instructions further cause the processor 1502 to perform the following process: determining whether the received DPR is an extended DPR or a conventional DPR by detecting the value of a logical channel identity (LCID) in a medium access control (MAC) subheader used for a common control channel (CCCH) service data unit (SDU) or a separately set medium access control (MAC) subheader, where it is determined that the received DPR is an extended DPR if it is detected that the LCID value is a reserved LCID value or a reused LCID value used for identifying other MAC CEs.

In the embodiment in which the base station 1500 is used for performing the method 1400, when executed by the processor 1502, the instructions cause the processor 1502 to perform the following process:

transmitting, to UE, a UE capability enquiry message for requesting transfer of UE radio access capabilities; and receiving a UE capability information message from the UE, where the UE capability information message includes indication information for indicating that or whether the UE supports an extended data volume and power headroom report (DPR).

The program running on the device according to the present disclosure may be a program that enables a computer to implement the functions of the embodiments of the present disclosure by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present disclosure may be recorded on a computer-readable recording medium. The corresponding functions can be achieved by reading programs recorded on the recording medium and executing them by the computer system. The so-called "computer system" may be a computer system embedded in the device, which may include operating systems or hardware (for example, peripherals). The "computer-readable recording medium" may be a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in the present specification may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. The following may be used as terminal devices or communication devices: fixed or non-mobile electronic devices installed indoors or outdoors, such as AV equipment, kitchen equipment, cleaning equipment, air conditioners, office equipment, vending machines, and other household appliances.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications can be made to the present disclosure within the scope of the claims. Embodiments resulted from the appropriate combinations of the technical means disclosed in different embodiments are also included within the technical scope of the present disclosure. In addition, components with the same effect described in the above embodiments may be replaced with one another.

The invention claimed is:

1. A user equipment performing power headroom reporting, comprising:
   a processor; and
   a memory, wherein
   the memory stores instructions that cause the processor to:
      receive, from a base station, a system information block 2; and
      report, to the base station, Data Volume and Power Headroom Report MAC control element in msg3,
   the Data Volume and Power Headroom Report MAC control element includes Power Headroom field,
   the Power Headroom field is either 2 bit-field or 4 bit-field, and
   when an indication is included in the system information block 2 received from the base station, and the base station dictates the indication indicates that it is allowed to report Power Headroom field with 4 bit in msg3, then the Data Volume and Power Headroom Report MAC control element includes the Power Headroom field with 4 bit.

2. A base station performing for power headroom reporting performed by a user equipment, comprising:
   a processor; and
   a memory, wherein
   the memory stores instructions that cause the processor to:
      transmit, to the user equipment, a system information block 2; and
      receive, from the user equipment, Data Volume and Power Headroom Report MAC control element in msg3,
   the Data Volume and Power Headroom Report MAC control element includes Power Headroom field,
   the Power Headroom field is either 2 bit-field or 4 bit-field, and
   when an indication is included in the system information block 2 transmitted to the user equipment, and the base station dictates the indication causes the user equipment to determine to use, as the Power Headroom field, the Power Headroom field with 4 bit, then the indication indicates that it is allowed to report the Power Headroom field with 4 bit in msg3.

3. A method for power headroom reporting performed by a user equipment, comprising:
   receiving, from a base station, a system information block 2; and
   reporting, to the base station, Data Volume and Power Headroom Report MAC control element in msg3, wherein,
   the Data Volume and Power Headroom Report MAC control element includes Power Headroom field,
   the Power Headroom field is either 2 bit-field or 4 bit-field, and
   when an indication is included in the system information block 2 received from the base station, and the base station dictates the indication indicates that it is allowed to report Power Headroom field with 4 bit in msg3, then the Data Volume and Power Headroom Report MAC control element includes the Power Headroom field with 4 bit.

4. A method performed by a base station for power headroom reporting performed by a user equipment, comprising:
   transmitting, to the user equipment, a system information block 2; and
   receiving, from the user equipment, Data Volume and Power Headroom Report MAC control element in msg3, wherein,
   the Data Volume and Power Headroom Report MAC control element includes Power Headroom field,
   the Power Headroom field is either 2 bit-field or 4 bit-field, and
   when an indication is included in the system information block 2 transmitted to the user equipment, and the base station dictates the indication causes the user equipment to determine to use, as the Power Headroom field, the Power Headroom field with 4 bit, then the indication indicates that it is allowed to report the Power Headroom field with 4 bit in msg3.

* * * * *